J. R. TEASS.
Corn and Rice Planter.
No. 219,036. Patented Aug. 26, 1879.
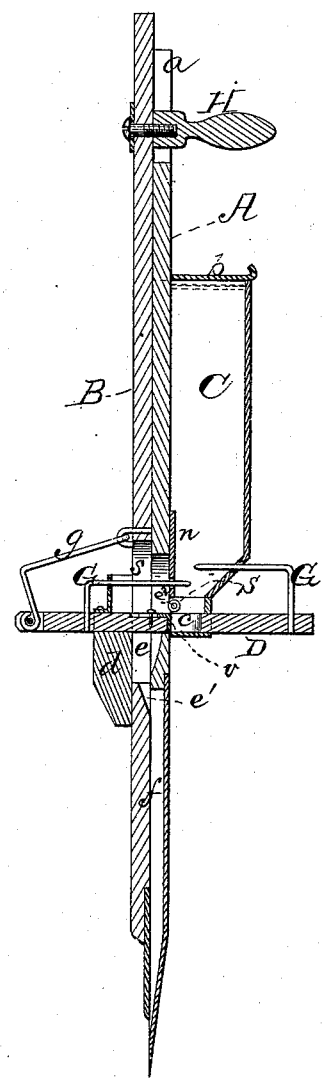
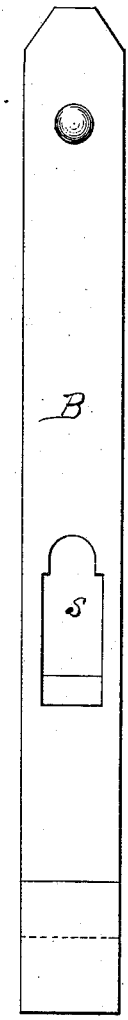
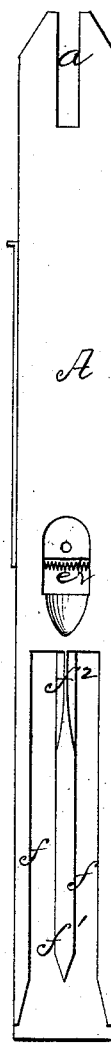
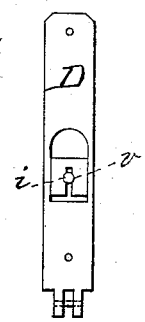

UNITED STATES PATENT OFFICE.

JOHN R. TEASS, OF ST. ALBANS, WEST VIRGINIA.

IMPROVEMENT IN CORN AND RICE PLANTERS.

Specification forming part of Letters Patent No. 219,036, dated August 26, 1879; application filed July 12, 1879.

*To all whom it may concern:*

Be it known that I, JOHN R. TEASS, of St. Albans, in the county of Kanawha and State of West Virginia, have invented a new and valuable Improvement in Corn and Rice Planters; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a longitudinal vertical section of my improved seed-planter; and Figs. 2, 3, and 4 are detail views thereof.

This invention has relation to improvements in hand corn and rice planters; and the nature of the invention consists in combining, with a longitudinally-slotted plunger and a spade-plate having a seed-hopper fixed thereto, a dropper-slide extending through the hopper, the slot of the plunger, and a hole in the spade-plate, an angular metallic rod pivoted at one end to the slide and at the other to the plunger, and angular metallic rods extending from opposite sides of the slide into the hopper, and, during its reciprocation, serving both as guides and agitators, as will be hereinafter more fully set forth.

In the annexed drawings, the letter A designates the spade-plate, having its lower end shod with metal, and provided at its upper end with a slot, $a$, through which extends the operating-handle H of the plunger B.

C indicates a preferably metallic hopper secured to the spade-plate, and closed at top by a sliding door, $b$. This hopper is funnel-shaped at its bottom, for convenience in directing the grain into the cup $c$ of the dropper-slide D. This extends through a guide-staple under the hopper and through a hole in the spade-plate and a slot in the plunger, so that it does not interfere with the reciprocation of the latter. It rests upon a bearing-block, $d$, which closes the lower part of slot $s$ in the plunger, and is connected to the spade by metallic plates, thus serving as a guide for said plunger, and forming, with its slot $s$, a chamber, $e$, below the slide, into which the seed is delivered directly from the same.

From chamber $e$ the seed is delivered by an inclined chute, $e^1$, into the grooves $f$, formed in the contiguous face of the spade-plate and separated from each other by a rib, $f^1$, having a beveled angular upper end, $f^2$, serving as a divider or deflector that directs the grain into the grooves $f$, and prevents the planting of seed from being deposited all in one place in the hill.

The reciprocation of the plunger is made to actuate the slide by means of the angular metallic connecting-rod $g$, pivoted at one end to the slide and at the other to the plunger, as shown in Fig. 1.

G represents angular metallic agitating-rods extending up vertically from the dropper-slide on opposite ends thereof, and extending into the hopper, the one above the other. These rods serve not only to lighten up the seed and prevent it from packing in the cylinder, but also to guide the slide during its reciprocations.

This slide is constructed, as shown in Fig. 4, with an oblong opening, which may be limited in size to receive a less quantity of seed by means of a right-angular slotted valve, $v$, and an adjusting-screw, $i$. This valve has one branch extending down into the seed-cup and the other recessed into the upper surface of the slide and flush therewith.

Inside of the hopper, and partly closing the hole in the spade-plate through which the slide extends, is a metallic plate, $n$, and below this plate is a striker, S. This is composed of a spiral spring, $e^2$, usually, that occupies the remaining space between the slide and the lower edge of the plate $n$ aforesaid, and that, bearing yieldingly against the slide, acts as a striker to sweep off any excess of grain in the seed-cup.

Having thus described my invention, what I claim as new, and desire to secure by Letters Patent, is—

In a hand seed-planter, the combination, with a longitudinally-slotted plunger and a spade-plate having a seed-hopper fixed thereto, of a dropper-slide extending through the hopper, the plunger, and spade, the angular metallic rod pivoted at one end to the slide and at the other to the plunger, and the angular metallic guides G, extending into the hopper and serving as agitators, substantially as specified.

In testimony that I claim the above I have hereunto subscribed my name in the presence of two witnesses.

JOHN R. TEASS.

Witnesses:
  A. JOHNSON,
  A. A. ROCK.